(12) United States Patent
Korovin et al.

(10) Patent No.: US 7,198,545 B1
(45) Date of Patent: Apr. 3, 2007

(54) METHOD OF CALIBRATION AND DATA EVALUATION FOR EDDY CURRENT METROLOGY SYSTEMS

(75) Inventors: Nikolay Korovin, deceased, late of Phoenix, AZ (US); by Tatyana Korovina, legal representative, Phoenix, AZ (US); Robert J. Stoya, Cave Creek, AZ (US)

(73) Assignee: Novellus Systems, Inc., San Jose, CA (US)

( * ) Notice: Subject to any disclaimer, the term of this patent is extended or adjusted under 35 U.S.C. 154(b) by 66 days.

(21) Appl. No.: 11/258,654

(22) Filed: Oct. 25, 2005
(Under 37 CFR 1.47)

(51) Int. Cl.
*B24B 49/00* (2006.01)

(52) U.S. Cl. .............. 451/5; 451/10; 451/11; 451/41; 451/54; 324/229; 702/64

(58) Field of Classification Search .......... 451/5, 451/9, 10, 11, 41, 54, 285, 287; 324/202, 324/229, 230; 702/64, 85
See application file for complete search history.

(56) References Cited

U.S. PATENT DOCUMENTS

| | | | | |
|---|---|---|---|---|
| 6,285,183 | B1 * | 9/2001 | Collingwood et al. | 324/202 |
| 6,809,542 | B2 * | 10/2004 | Dorman | 324/765 |
| 6,929,531 | B2 * | 8/2005 | Gotkis et al. | 451/8 |
| 7,016,795 | B2 * | 3/2006 | Swedek et al. | 702/64 |
| 2004/0002171 | A1 * | 1/2004 | Gotkis et al. | 438/5 |
| 2004/0138838 | A1 * | 7/2004 | Scheiner et al. | 702/64 |
| 2005/0017712 | A1 * | 1/2005 | Le | 324/230 |
| 2005/0194971 | A1 * | 9/2005 | Lehman et al. | 324/230 |

* cited by examiner

*Primary Examiner*—Eileen P. Morgan
(74) *Attorney, Agent, or Firm*—Ingrassia Fisher & Lorenz, P.C.

(57) ABSTRACT

Methods are provided for calibrating a tool using an eddy current probe and calibration wafers that each have a measurable predetermined property and a measurement of the measurable predetermined property of a first calibration wafer is different than a measurement of the measurable predetermined property of a second calibration wafer. The methods include determining a first set of impedance measurements of the calibration wafers while each is disposed in the tool and the tool has a tool parameter that is at a first condition, collecting a second set of impedance measurements of the calibration wafers while each is disposed in the tool and the tool parameter is at a second condition, establishing a reference point, based upon a first and a second data point from the first set of impedance measurements and a first and a second data point from the second set of impedance measurements.

19 Claims, 4 Drawing Sheets

METHOD OF CALIBRATION AND DATA EVALUATION FOR EDDY CURRENT METROLOGY SYSTEMS

FIELD OF THE INVENTION

This invention relates generally to a method for using a chemical mechanical polishing ("CMP") tool, and more particularly, a method for calibrating the CMP tool.

BACKGROUND OF THE INVENTION

Integrated circuits are manufactured from wafers that are typically created by growing an elongated cylinder or boule of single crystal silicon and slicing individual wafers from the cylinder. Slicing may cause one or both faces of the wafer to be somewhat rough; however, at least one face of the wafer should be substantially flat in order to facilitate reliable semiconductor junctions formed from subsequent layers of material that may be applied thereto. Thus, chemical-mechanical polishing (CMP) is performed on each wafer to remove projections and other imperfections to create a smooth planar surface. After the wafer surface is planarized, various materials, such as metals, may be deposited over the wafer to create composite thin film layers. In some cases, the metals are initially over-deposited onto the wafer to form a relatively thick metal layer and a CMP process is employed to polish and thin the metal layer.

Generally, a CMP process thins the wafer and removes the projections and imperfections on the wafer by contacting the wafer with a polishing surface and an abrasive slurry. Relative motion between the wafer and polishing surface is provided at a selected rate, which may be controlled to yield a metal layer having a desired thickness.

To determine the thickness of the metal layer, some CMP tool configurations include an eddy current probe. The eddy current probe generates a magnetic field which experiences a magnetic flux change when a conductive material, such as, for example, the metal layer on the wafer, is passed therethrough. The magnetic flux change provides an impedance that is then used to extrapolate measurements of certain properties of a wafer, such as the hardness or density of the wafer or the thickness of the metal layer.

Although the above-mentioned method is generally effective in most circumstances, it may have drawbacks in other circumstances. For example, the CMP tool may become contaminated or its components may become worn over time. Consequently, the eddy current probe may obtain inaccurate impedance measurements. Specifically, in some instances a foreign metallic object may become trapped in or come into the vicinity of the magnetic field. Thus, the foreign metallic object may undesirably interfere with the magnetic field and may inadvertently adjust the impedance measurement so that the measurement may not be as accurate as desired. In another example, the polishing surface may be a pad that has a thickness that diminishes over use and time. Hence, the pad used to polish a first wafer may not have the same thickness when used to polish a second wafer, which may also affect the ability of the eddy current probe to obtain accurate impedance measurements.

Accordingly, it is desirable to have a CMP tool that is capable of calibrating its tool parameters to account for contamination and/or worn components. In addition, it is desirable for the tool to yield accurate impedance measurements, despite the presence of a contamination and/or worn component. Moreover, it is desirable for the tool to produce high quality wafers. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
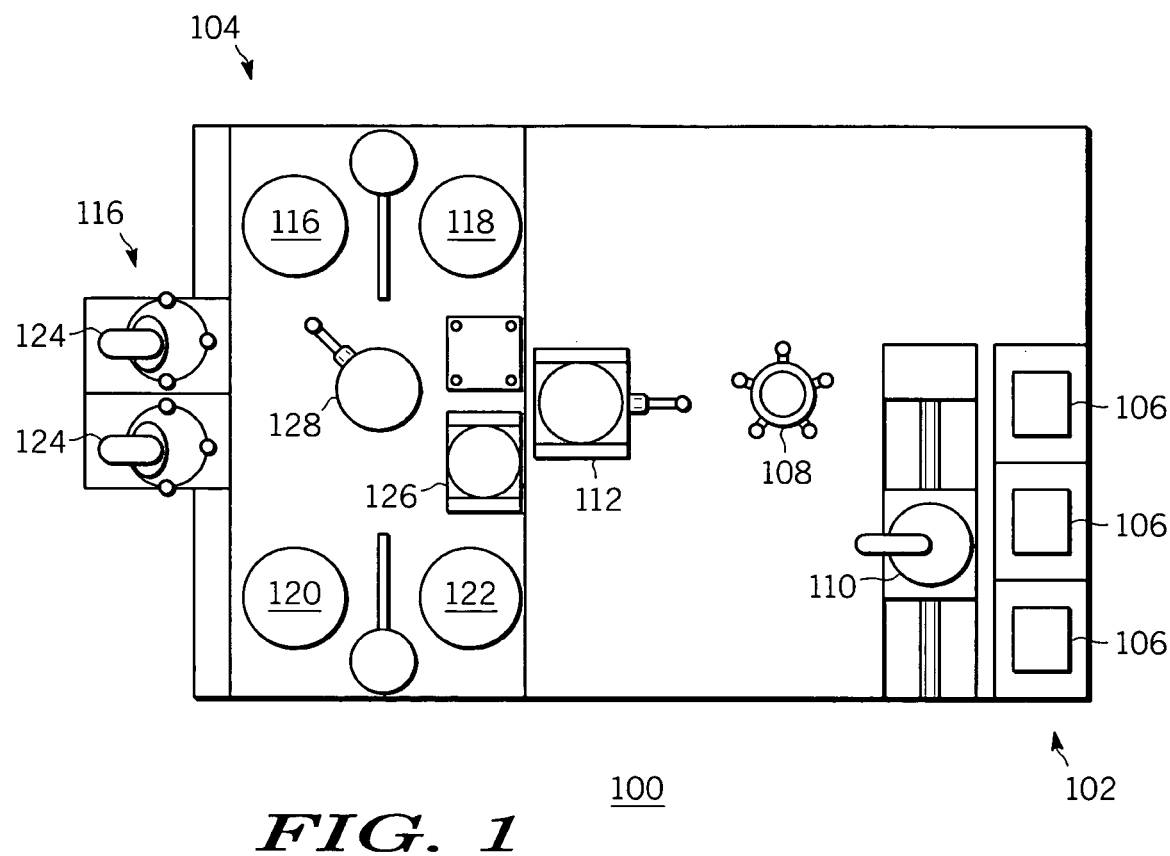
FIG. 1 is a top cutaway view of an exemplary CMP tool.

The following detailed description of the invention is merely exemplary in nature and is not intended to limit the invention or the application and uses of the invention. Furthermore, there is no intention to be bound by any theory presented in the preceding background of the invention or the following detailed description of the invention.

The drawing figures are intended to illustrate the general manner of employing the inventive method and composition in an apparatus and are not necessarily to scale. In the description and in the claims, the terms such as up, down, downward, inward, upper, lower, top, bottom, and the like may be used for descriptive purposes. However, it is understood that the embodiments of the invention described herein are capable of operation in other orientations than as shown, and the terms so used are only for the purpose of describing relative positions and are interchangeable under appropriate circumstances. The term "chemical mechanical planarization" is also often referred to in the industry as "chemical mechanical polishing," and it is intended to encompass herein both terms by the use of "chemical mechanical planarization" and to represent each by the acronym "CMP." For purposes of illustration only, the invention will be described as it applies to a CMP apparatus and to a CMP process and specifically as it applies to the CMP processing of a semiconductor wafer. It is not intended, however, that the invention be limited to these illustrative embodiments; instead, the invention is applicable to a variety of processing apparatus and to the processing and handling of many types of work pieces.

FIG. 1 schematically illustrates a conventional CMP apparatus 100. CMP apparatus 100 generally includes at least a work piece load/unload station 102 and a multistation polishing system 104. Additionally, CMP apparatus 100 preferably includes at least one controller (not shown) that is coupled to station 102 and system 104 and is configured to operate each according to at least one embodiment of the method of the present invention.

Load/unload station 102 includes at least one cassette 106, an intermediate staging area 108, a dry robot 110, and a wet robot 112. Cassette 106 is configured to include one or more work pieces. When cassette 106 is suitably coupled to CMP apparatus 100, dry robot 110 transports a work piece from cassette 106 to intermediate staging area 108. From staging area 108, the work piece then may be transported by wet robot 112 to polishing system 104 via stage 126. After polishing, wet robot 112 then may transfer the work piece to a clean system (not shown) for cleaning and drying, or optionally, any other suitable system, prior to transport back to load/unload station 102.

Polishing system 104 is configured to polish a work piece that is transferred thereto and may include one or more, preferably four polishing stations 116, 118, 120, and 122, a buff station 124, a stage 126, and a robot 128 configured to transport the work piece between polishing stations 116, 118, 120, and 122 and the stage 126. Each polishing station 116, 118, 120, and 122 is configured to operate independently from one another and may be configured to perform specific functions of the CMP process, such as the delivery of CMP slurry to a work piece. A slurry container (not shown) may be externally or internally associated with polishing system 104 to supply CMP slurry to polishing stations 116, 118, 120, and/or 122 through at least one supply channel (not shown). CMP slurry may be supplied to a work piece via any one of numerous conventionally used methods. For example, slurry can be supplied to a polishing platen for a through-the-pad polishing system, or to a work piece holder for systems in which the slurry is dispensed onto the work piece surface.

Figure 2:
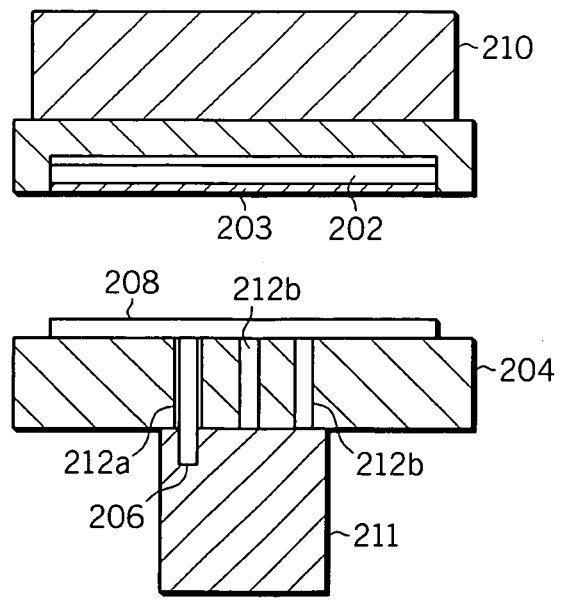
FIG. 2 is side view of an exemplary polishing station that may be implemented into the exemplary CMP tool of FIG. 1.

FIG. 2 illustrates a cross sectional side view of a simplified exemplary polishing station 200 that may be incorporated into conventional CMP apparatus 100. Polishing station 200 may be incorporated as any one or all of the four polishing stations 116, 118, 120, and 122 disposed in CMP apparatus 100 described above. Polishing station 200 may have a work piece 202 disposed therein and includes a platen 204, an eddy current probe 206, a polishing surface 208, and a wafer carrier assembly 210. Platen 204 is configured to serve several purposes, including exerting pressure against work piece 202 during a polishing operation. In this regard, platen 204 is coupled to a motor assembly 211 that moves platen 204 toward wafer carrier assembly 210 and that is configured to move platen 204 in various directions, e.g. linearly, orbitally, or rotationally. It will be appreciated that, alternatively, or in addition, polishing surface 208 may be urged against work piece 202 by a drive controller (not shown). Platen 204 may also be configured to provide conduits for receiving polishing fluid and/or other devices. In one example, such as shown in FIG. 2, platen 204 includes a plurality of openings 212a and 212b formed within platen 204 through which polishing fluid may be dispensed to polishing surface 208.

Eddy current probe 206 generates a magnetic field and detects changes in the magnetic flux density of the field when a metal object is placed therein, thus yielding a measurements that can be plotted on an impedance plane. The data points of the impedance plane are typically represented as (x,y) coordinates, where x represents a resistance and y represents reactance. Reactance is a combination of inductance and capacitance. Eddy current probe 206 may be disposed in any suitable portion of polishing station 200. In one exemplary embodiment, eddy current probe 206 is disposed in an opening 212c in platen 204, as illustrated in FIG. 2. In another exemplary embodiment, eddy current probe 206 is disposed proximate platen 204. Additionally, although one eddy current probe 206 is included in the illustrated embodiment, it will be appreciated that more probes 206 may be employed as well.

Polishing surface 208 polishes work piece 202 when work piece 202 is urged against polishing surface 208 and may be any type of device conventionally used for polishing a work piece. In one exemplary embodiment, polishing surface 208 is a polishing pad, such as a polyurethane polishing pad available from Rodel Products Corporation of Scottsdale, Ariz., is employed. Polishing surface 208 has a predetermined initial thickness and may be used for more than one polishing operation. Polishing surface 208 is disposed over eddy current probe 206 and may be removably coupled to platen 204.

Wafer carrier assembly 210 is configured to carry work piece 202 by any method known in the industry, such as, for example, vacuum suction or suitable wafer grippers and to urge work piece 202 against polishing surface 208. Preferably, work piece 202 experiences a uniform and constant pressure of approximately one pound per square inch (psi) or less, although it may be appreciated that any suitable pressure that promotes substantially planar material removal may be used.

Work piece 202 may be disposed over eddy current probe 206 and polishing surface 208 when measurements of properties of work piece 202, such as the thickness of metal layer 203 and/or the hardness or density of work piece 202, need to be obtained. Work piece 202 may include a metal layer 203 deposited thereon. Although a single metal layer 203 is shown, other layers, such as other metal layers or thin film layers, may also be included on work piece 202. Additionally, though the exemplary configuration illustrated in FIG. 2 shows metal layer 203 contacting polishing surface 208, work piece 202 may include an intervening layer or material between metal layer 203 and polishing surface 208.

Figure 3:
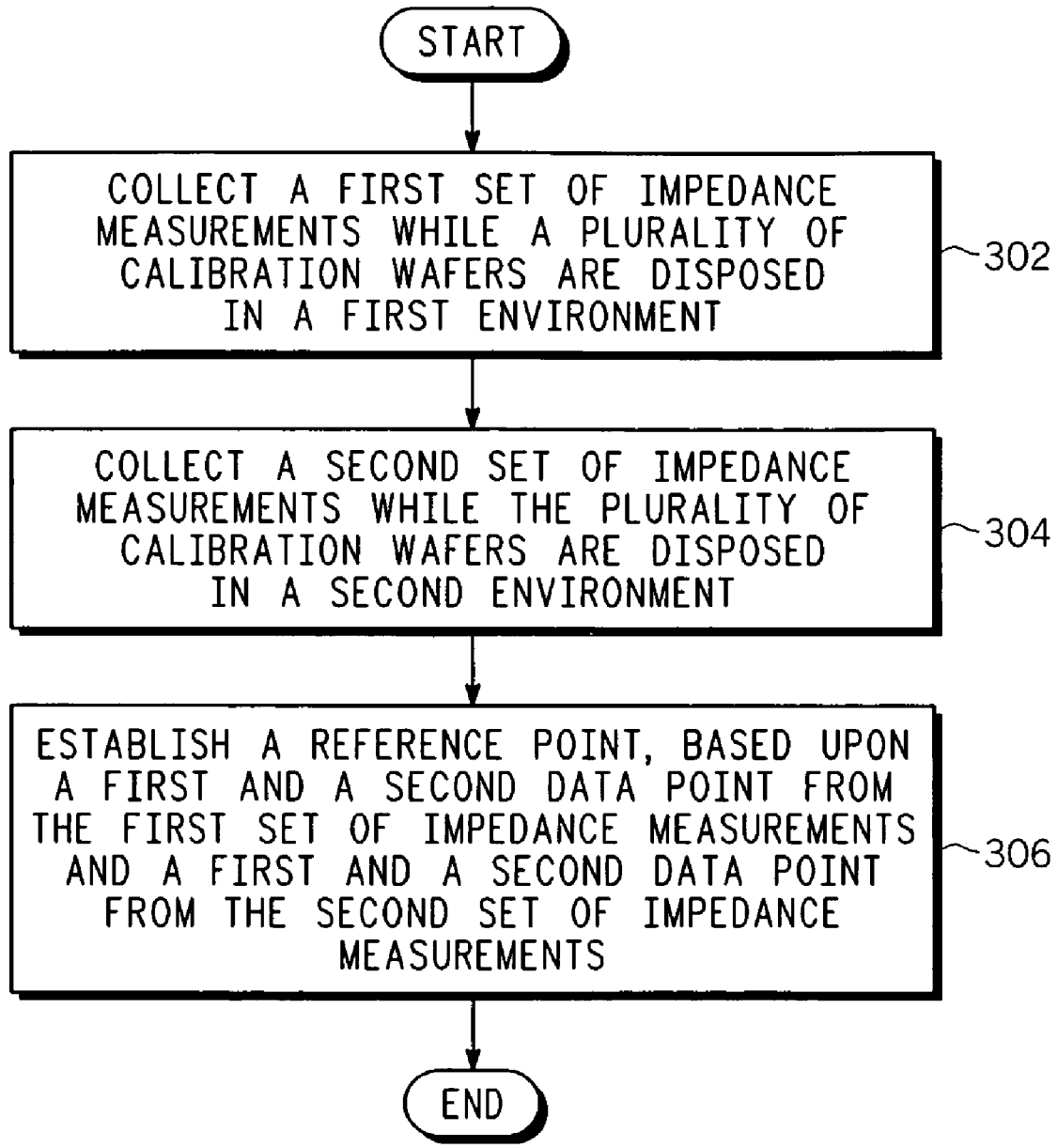
FIG. 3 is a flow chart illustrating an exemplary method of calibrating a parameter of the exemplary CMP tool of FIG. 1.

In accordance with an exemplary embodiment of the present invention, to obtain accurate measurements of the properties of work piece 202, eddy current probe 206 may be used in a process to determine a reference point that is used to calibrate CMP apparatus 100. FIG. 3 is a flow diagram of an exemplary embodiment of a process 300. Process 300 may be carried out manually or with a non-illustrated controller and is generally carried out in the absence of polishing.

Generally, process 300 includes a first step 302 wherein a first set of data points representing impedance is collected for a set of calibration wafers that are each sent through an apparatus having a tool parameter that is set at a first condition. Next, a second set of data points representing impedance is collected for each of the calibration wafers as they are sent through the apparatus when the tool parameter of the apparatus is set at a second condition, step 304. Then, a reference point is established, based upon a first and a second data point from the first set of data points representing impedance and a first and a second data point from the second set of data points representing impedance, step 306.

Step 302 may include the steps of obtaining the calibration wafers and measuring the impedance of each of the calibration wafers while disposed in an apparatus having a tool parameter set at a first condition. The calibration wafers may be obtained from any one of numerous sources and may be any one of a number of types of conventional wafers having a metal layer deposited thereon. Each calibration wafer has a predetermined property that has a value that can be calculated from an impedance measurement of the calibration wafer and that can be affected by a CMP process. Examples of predetermined properties include, but are not limited to, metal layer thicknesses and hardness measurements or densities of a work piece. Additionally, each predetermined property value for a particular calibration wafer is different than the predetermined property value of the other calibration wafers.

Although any number of calibration wafers may be obtained, more than two calibration wafers are preferably used so that at least a first and a second data point are obtained. It will be appreciated that the employment of more calibration wafers and/or calibration wafers having small predetermined property differences may yield better results. For instance, if ten calibration wafers having metal layer thicknesses that are 100 nm apart from one another are used, each data point measurement will be 100 nm apart from one another yielding a thickness measurement range of at least 1,000 nm. Consequently, a relatively wide range of metal layer thickness predictions may be made. However, if ten calibration wafers are used and the thickness variations are 50 nm from one another, each data point measurement will only be 50 nm apart from one another and a measurement range of at least 500 nm will be obtained. This narrower range provides more accuracy for predicting thicknesses that fall within the range, but the range of possible thickness predictions is smaller. The impedance measurements may be collected in any one of numerous conventional manners. In one exemplary embodiment, the impedance of each calibration wafer is measured by moving the calibration wafers through a magnetic field generated by eddy current probe 210 and detecting a magnetic flux density change.

As briefly mentioned previously, the calibration wafers are individually disposed in an apparatus having a tool parameter that is at a first condition when impedance is measured. The tool parameter may be any parameter within CMP apparatus 100 that can be deliberately changed by a tool operator or that may change over use and time. For example, the tool parameter may be the newness of polishing surface 208. In another example, the tool parameter may be a section of CMP apparatus 100 in which no metallic interference is present.

Next, a second set of data points representing impedance is collected for each of the calibration wafers as they are sent through the apparatus when the tool parameter of the apparatus is set at a second condition, step 304. Step 304 may include the steps of disposing the set of calibration wafers into the apparatus when the tool parameter of the apparatus is set at a second condition and obtaining the second set of data points representing impedance. The second condition is preferably a tool parameter change that represents an interference or a change that could occur within CMP apparatus 100. In one example, the second condition is a worn polishing surface 208. This change represents a wafer lift-off effect. In another example, the second condition is a CMP apparatus 100 that includes a metallic interference. The metallic interference represents the presence of an unwanted metallic object that may be present in apparatus 100, for example from metallic components of the apparatus 100, such as a pad conditioner, wafer carrier, or a metallic retaining ring. It will be appreciated that other environmental factors may alternatively be considered as well.

The second set of data points representing impedance are obtained in substantially the same manner as in step 302. Preferably, the same set of and the same number of calibration wafers used in step 302 are employed in step 304 to at least obtain a first and a second data point. Alternatively, calibration wafers that are substantially identical to the set of calibration wafers used in step 302 may be used as well. Additionally, the manner by which the second set of data points is obtained is preferably the same as that used in step 302. It will be appreciated, however, that any other conventional method for obtaining impedance may be employed also.

Once the data points representing impedance are collected, a reference point is established, step 306. The reference point may be obtained graphically or may be calculated. In one exemplary embodiment in which the reference point is determined graphically, a first and a second data point from the first set of data points representing impedance and a first and a second data point from the second set of data points representing impedance are plotted onto an impedance plane where the x-axis of the plane represents resistance and y represents reactance. It will be appreciated that the first and second data points of the first set of data points representing impedance may be any one of the data points that were collected in step 302; however, the first and second data points of the second set of data points representing impedance preferably correspond with the first and second data points of the first set of data points representing impedance so that the data points represent the same two calibration wafers disposed in different environments. It will further be appreciated that the selected first and second data points need not be adjacent one another.

Figure 4:
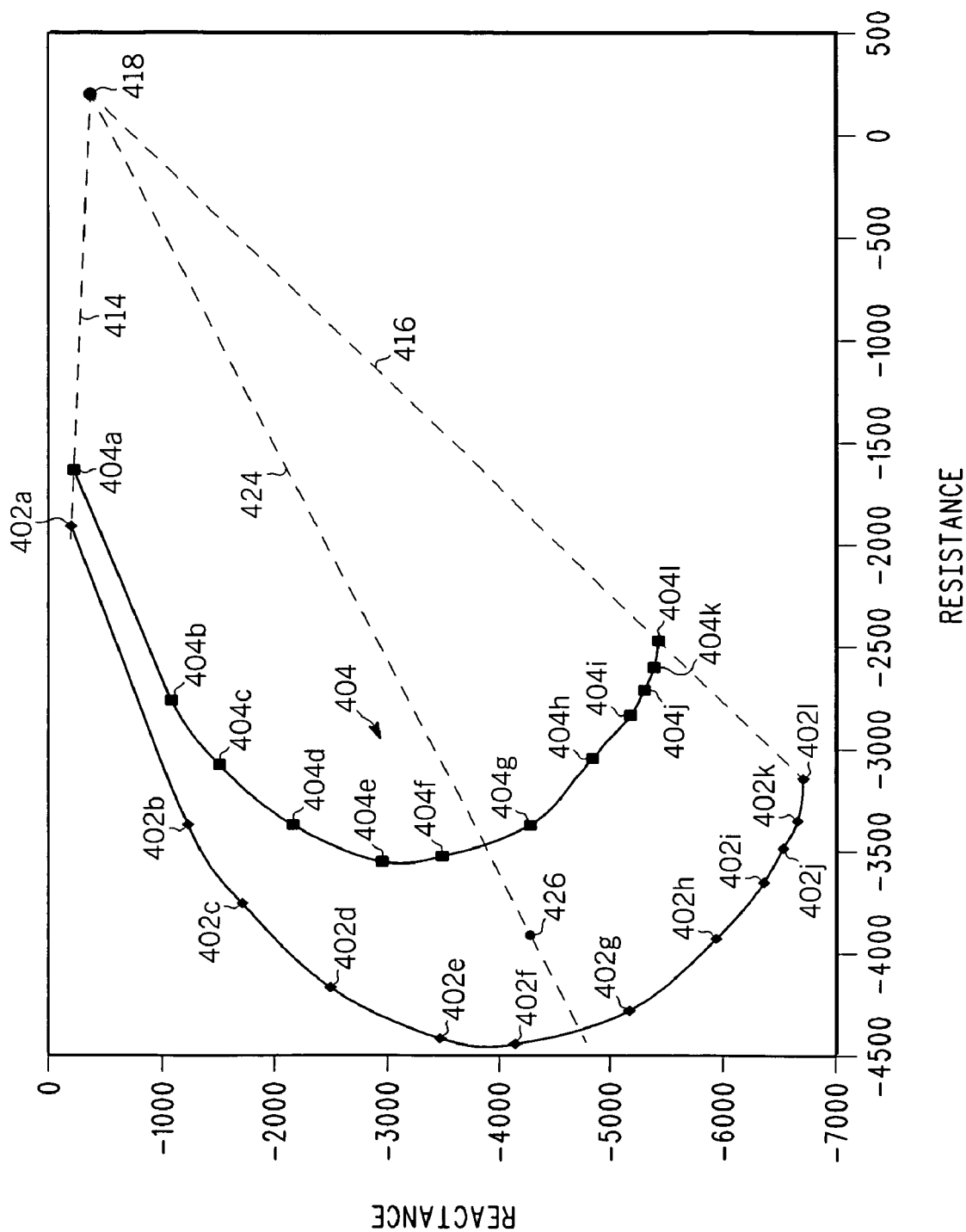
FIG. 4 is an impedance plane illustrating one step of the exemplary method depicted in FIG. 3.

FIG. 4 illustrates one exemplary process by which to graphically determine a reference point. The graph in FIG. 4 includes data points 402a–402l and data points 404a–404l. The reference numbers 402 and 404 represent a first set 402 of impedance data points obtained while the calibration wafers are subjected to a first condition and a second set 404 of impedance data points obtained while the calibration wafers is subjected to a second condition. The reference letters a–l represent each calibration wafer.

First, two data points from the first set 402 of impedance data points are selected, for example, data points 402a and 402l. Then, two data points from the second set 404 of impedance data points that correspond to two data points from the first set 402 are selected. For instance, in the above example, if data points 402a and 402l are selected, data points 404a and 404l are subsequently selected. Thus, data points 402a and 404a and data points 402l and 404l are impedance measurements of the same calibration wafer subjected to different conditions. It will be appreciated that the selected point may be chosen at random. Alternatively, two data points that are within a predetermined proximity to each other may be chosen to strategically obtain a more accurate reference point for those points within the predetermine proximity of the selected two data points.

Next, data points 402a and 404a are connected to form a first line 414 and data points 402l and 404l are connected to form a second line 416. The first and second lines 414 and 416 are extended until they intersect and the point of intersection is the reference point 418. As mentioned above, the first selected data points, in this case, 402a and 402b may be randomly selected; however, it should be appreciated that random selection of other data points may yield a different reference point.

In another exemplary embodiment, the reference point 418 is calculated. In this embodiment, data points 402a and 402b of the first set of data points representing impedance $(X_{1A}, Y_{1A})$ and $(X_{1B}, Y_{1B})$, respectively, and data points 404a and 404b of the second set of data points representing impedance $(X_{2A}, Y_{2A})$ and $(X_{2B}, Y_{2B})$, respectively, are entered into the following equations [1] and [2] to calculate the coordinate of the reference point 418:

$$Y_A = m_A X_A + b_A \text{ represents line } 414 \qquad [1];$$

$$Y_B = m_B X_B + b_B \text{ represents line } 416 \qquad [2];$$

where $m_A=[Y_{1A}-Y_{2A}]/[X_{1A}-X_{2A}]$ is the slope of the line 414;

where $m_B=[Y_{1B}-Y_{2B}]/[X_{1B}-X_{2B}]$ is the slope of the line 416;

b is the Y intercept; and $[X_A, Y_A]$ and $[X_B, Y_B]$ are the coordinates of the reference point 418.

Because $[X_A, Y_A]$ and $[X_B, Y_B]$ are the same coordinates, set $X_A=X_B$ and $Y_A=Y_B$. Consequently, $X_A$, $Y_A$, $X_B$, and $Y_B$ can be calculated. These functions may be performed manually or by a non-illustrated controller. It will be appreciated that any other functions that represent line 414 and line 416 may be used to calculate to calculate reference point 418 as well.

Although two sets of impedance measurements are utilized above, more sets of data points representing impedance may be used as well. The additional sets of data points may be collected while the same set of calibration wafers used in steps 302 and 304 are disposed in the CMP apparatus 100 when the tool parameter of the apparatus 100 is changed to a third condition. For example, the first condition may be a new polishing surface 208 and no metallic interference, the second condition may be a worn polishing surface 208 and no metallic interference, while the third condition may be both a worn polishing surface 208 and metallic interference. Any one of a number of other environments and combinations thereof may be employed as well.

The changed tool parameter condition may be taken into account when the reference point is determined. For example, when graphically establishing the reference point, first data points of the first and second sets of data points representing impedance and a first data point of a third set of data points representing impedance are selected, where each data point represents the same calibration wafer having a known predetermined property disposed in an apparatus having a first tool parameter condition, second tool parameter condition, and a third tool parameter condition. The data points are plotted in an impedance plane and a line is drawn through the data points. If a line cannot be drawn to connect the three data points, it is drawn so that each of the data points is proximate to the line. Next, second data points of the first and second sets of data points representing impedance and a second data point of the third set of data points representing impedance are selected, where each data point represents the same calibration wafer having a known predetermined property disposed in an apparatus having a first condition, second condition, and a third condition. Similar to above, the data points are disposed on the same impedance plane as the above-mentioned data points and a line is drawn through the second data points in the same manner. The lines are extended until they intersect and the point of intersection is the reference point.

The reference point may be used to extrapolate a predetermined property measurement of an actual, non-calibration wafer. Extrapolation may be performed in any one of numerous conventional manners. With reference to FIG. 4, every impedance that falls along the first line 414 has the same predetermined property measurement as the data points 402*a* and 404*a*. Similarly, every impedance that falls on the second line 416 has the same predetermined property measurement as data points 402*b* and 404*b*. In another exemplary embodiment, a data point representing an impedance measurement of an actual wafer may not fall on either first line 414 or second line 416. In such case, a line 424 is extended from reference point 418 through the actual wafer data point, shown in FIG. 4 as reference numeral 426. If line 424 extends close to one of any of the data points of the first and second sets of data points representing impedance, the measurement of the predetermined property of the actual wafer may be approximated. For example, assuming the predetermined property is a thickness, data point 402*f* is an impedance measurement for a calibration wafer having a thickness of 50 nm, and data point 402*g* is an impedance measurement for a calibration wafer having a thickness of 60 nm, if line 424 falls between data points 402*f* and 402*g*, the actual wafer may have a thickness of approximately 55 nm.

In another exemplary embodiment, an association is created between the data points of the first and second sets of data points representing impedance and the reference point. For instance, an angle measurement may be calculated for each of the data points in relation to the reference point. Specifically, each data point may be entered into equation [3] to obtain an angle measurement value:

$$\ln[A\ \text{TAN}\{[Y-Y_{Ref\,Pt}]/[X-X_{Ref\,Pt}]\}] \quad [3]$$

Where [X, Y] is the new data point and $[X_{Ref\,Pt}, Y_{Ref\,Pt}]$ is the reference point.

Figure 5:
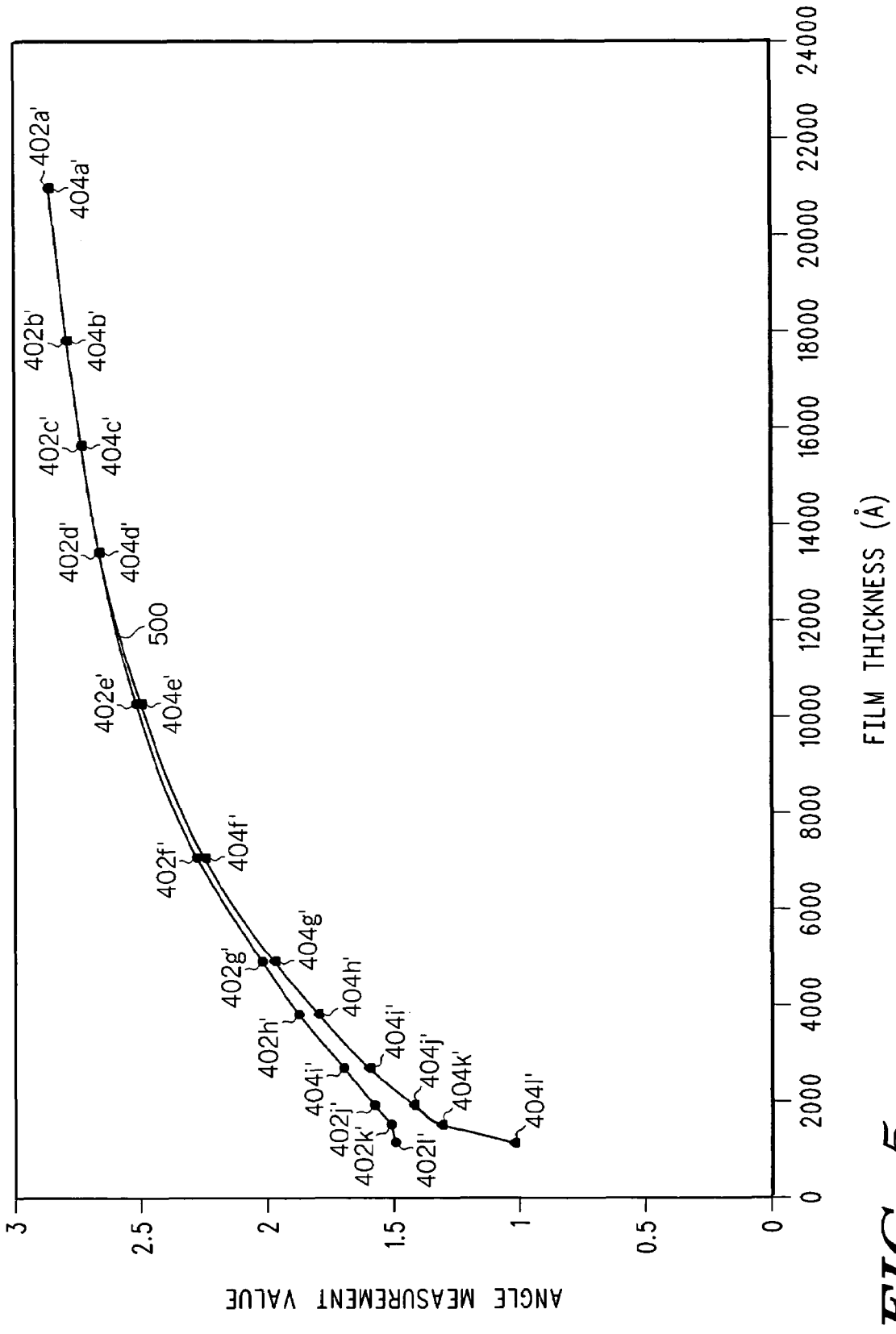
FIG. 5 is a graph illustrating another step of the exemplary method depicted in FIG. 3.

Each obtained angle measurement value is then plotted onto a graph. One exemplary graph is shown in FIG. 5. FIG. 5 includes an x-axis that represents the predetermined property (in this example, thickness of metal layer 203), a y-axis that represents angle measurement values obtained when the impedance measurements are entered into equation [3], and a plurality of data point coordinates 402*a'*–402*l'* and 404*a'*–404*l'*. The plotted values are fit into a curve to obtain a calibration curve 500. The calibration curve 500 is determined by any one of numerous conventional methods to obtain a fourth order fit, such as, for example, using a Neville's algorithm.

An impedance measurement may be obtained from an actual wafer and entered into the equation [3] to obtain a value. The obtained value is matched with a data point found on the calibration curve 500 of the graph shown in FIG. 5 having the same y-value as the obtained value. The x-value of the data point on the calibration curve 500 represents an actual, extrapolated, predetermined property measurement of the actual wafer.

In some circumstances, a number of the data points may not fit on the calibration curve 500 and a new calibration curve may need to be obtained. For example, as illustrated in FIG. 5, the data points having y-values between about 1 and 2, that is, points 402*g'*–402*l'* and 404*g'*–404*l'*, do not fit on the calibration curve 500. As a result, if the obtained value falls between 1 and 2, the extrapolated predetermined property measurement may not be as accurate as desired. In these instances, the data points having a y-value above 2 may be removed and a new calibration curve may be fitted to the remaining data points. The new calibration curve is then used to extrapolate an x-value for the obtained value.

The methods described herein can be used to obtain a reference point that may be used to determine a variety of predetermined property measurement values, while accounting for interferences that may be present in the CMP tool. For example, the methods and apparatus may be used for determining a thickness of a metal layer of a wafer. In addition, the methods of and apparatus are capable of producing high quality wafers.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for calibrating a chemical mechanical planarization tool using an eddy current probe and a plurality of calibration wafers, wherein each calibration wafer has a measurable predetermined property and a measurement of the measurable predetermined property of a first calibration wafer is different than a measurement of the measurable predetermined property of a second calibration wafer, the method comprising:
    determining a first set of impedance measurements of the calibration wafers while each calibration wafer is disposed in the tool and the tool has a tool parameter that is at a first condition;
    collecting a second set of impedance measurements of the calibration wafers while each calibration wafer is disposed in the tool and the tool parameter is at a second condition; and
    establishing a reference point, based upon a first and a second data point from the first set of impedance measurements and a first and a second data point from the second set of impedance measurements.

2. The method of claim 1, wherein the measurable predetermined property is a thickness of a metal layer of each calibration wafer.

3. The method of claim 1, wherein the measurable predetermined property is a density of a metal layer of each calibration wafer.

4. The method of claim 1, wherein the tool parameter is a polishing surface and the first condition is a new polishing surface, and the second condition is a worn polishing surface.

5. The method of claim 1, wherein the tool parameter is a tool environment, the first condition is a tool environment with no metal interference, and the second condition is a tool environment with a metal interference.

6. The method of claim 1, wherein the step of establishing comprises:
    plotting the first and second sets of impedance measurements on an impedance plane;
    creating a first line using the first data points from the first and second sets of impedance measurements; and
    forming a second line using the second data points from the first and second sets of impedance measurements.

7. The method of claim 1, wherein the step of establishing further comprises determining an intersection between the first and second lines to obtain the reference point.

8. The method of claim 1, further comprising:
    obtaining an impedance measurement of an actual wafer which has the measurable predetermined property; and
    extrapolating a measurement of the measurable predetermined property of the actual wafer based, in part, on the impedance measurement of the actual wafer and the reference point.

9. The method of claim 1, wherein the step of establishing further comprises:
    calculating an angle measurement for each data point of the first and second sets of impedance measurements using the following equation:
    $\ln[A\,TAN\{[Y-Y_{RefPt}]/[X-X_{RefPt}]\}]$, where $[X, Y]$ is a coordinate for a data point of one of the first and second sets of impedance measurements and $[X_{RefPt}, Y_{RefPt}]$ is a coordinate for the reference point; and
    plotting each angle measurement onto a graph.

10. The method of claim 9, wherein the step of establishing comprises:
    fitting the angle measurements into a curve to obtain a calibration curve.

11. A method for extrapolating a measurement of an actual wafer using an eddy current probe disposed in a tool and calibration wafers, wherein each calibration wafer has a measurable predetermined property and a measurement of the measurable predetermined property of a first calibration wafer is different than a measurement of the measurable predetermined property of a second calibration wafer, the method comprising:
    determining a first set of impedance measurements of the calibration wafers while each calibration wafer is disposed in the tool and the tool has a tool parameter that is at a first condition;
    collecting a second set of impedance measurements of the calibration wafers while each calibration wafer is disposed in the tool and the tool parameter is at a second condition; and
    establishing a reference point, based upon a first and a second data point from the first set of impedance measurements and a first and a second data point from the second set of impedance measurements by:
    plotting the first and second sets of impedance measurements on an impedance plane;
    creating a first line using the first data points from the first and second sets of impedance measurements; and
    creating a second line using the second data points from the first and second sets of impedance measurements.

12. The method of claim 11, wherein the step of establishing further comprises determining an intersection between the first and second lines to obtain the reference point.

13. The method of claim 12, further comprising:
    obtaining an impedance measurement of an actual wafer which has the measurable predetermined property; and
    extrapolating a measurement of the measurable predetermined property of the actual wafer based, in part, on the impedance measurement of the actual wafer and the reference point.

14. The method of claim 11, wherein the tool parameter is a polishing surface and the first condition is a new polishing surface, and the second condition is a worn polishing surface.

15. The method of claim 11, wherein the tool parameter is a tool environment, the first condition is a tool environment with no metal interference, and the second condition is a tool environment with a metal interference.

16. A method for extrapolating a measurement of an actual wafer using an eddy current probe disposed in a tool and calibration wafers, wherein each calibration wafer has a measurable predetermined property and a measurement of the measurable predetermined property of a first calibration wafer is different than a measurement of the measurable predetermined property of a second calibration wafer, the method comprising:

determining a first set of impedance measurements of the calibration wafers while each calibration wafer is disposed in the tool and the tool has a tool parameter that is set at a first condition;

collecting a second set of impedance measurements of the calibration wafers while each calibration wafer is disposed in the tool and the tool parameter is set at a second condition;

establishing a reference point, based upon a first and a second data point from the first set of impedance measurements and a first and a second data point from the second set of impedance measurements; and creating a calibration curve based on the data points of the first and second sets of impedance measurements.

17. The method of claim 16, wherein the step of creating further comprises:

calculating an angle measurement for each data point of the first and second sets of impedance measurements using the following equation:

$\ln[A\,TAN\{[Y-Y_{RefPt}]/[X-X_{RefPt}]\}]$, where $[X, Y]$ is a coordinate for a data point of one of the first and second sets of impedance measurements and $[X_{RefPt}, Y_{RefPt}]$ is a coordinate for the reference point; and plotting the calculated angle measurements onto a graph.

18. The method of claim 17, further comprising:

fitting the angle measurements into a curve to obtain the calibration curve.

19. The method of claim 18, further comprising:

obtaining an impedance measurement of an actual wafer which has the measurable predetermined property; and extrapolating a measurement of the measurable predetermined property of the actual wafer based, in part, on the impedance measurement of the actual wafer and the calibration curve.

* * * * *

UNITED STATES PATENT AND TRADEMARK OFFICE
CERTIFICATE OF CORRECTION

PATENT NO. : 7,198,545 B1
APPLICATION NO. : 11/258654
DATED : April 3, 2007
INVENTOR(S) : Korovina et al.

It is certified that error appears in the above-identified patent and that said Letters Patent is hereby corrected as shown below:

Column 10, line 1, "In[A TAN{" should be changed to --In [ATAN {--;
Column 12, line 1, "In[A TAN{" should be changed to --In [ATAN {--.

Signed and Sealed this

Tenth Day of July, 2007

JON W. DUDAS
*Director of the United States Patent and Trademark Office*